United States Patent
Burgun et al.

(10) Patent No.: US 7,759,404 B2
(45) Date of Patent: Jul. 20, 2010

(54) INHERENTLY OPEN-CELLED POLYPROPYLENE FOAM WITH LARGE CELL SIZE

(75) Inventors: Sandrine Burgun, Leutenheim (FR); Suresh Subramonian, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 541 days.

(21) Appl. No.: 11/663,800

(22) PCT Filed: Oct. 7, 2005

(86) PCT No.: PCT/US2005/036002

§ 371 (c)(1),
(2), (4) Date: Mar. 23, 2007

(87) PCT Pub. No.: WO2006/047060

PCT Pub. Date: May 4, 2006

(65) Prior Publication Data

US 2008/0058437 A1   Mar. 6, 2008

Related U.S. Application Data

(60) Provisional application No. 60/621,495, filed on Oct. 22, 2004.

(51) Int. Cl.
*C08L 47/00* (2006.01)
*C08J 9/00* (2006.01)
*C08F 110/00* (2006.01)

(52) U.S. Cl. .................. 521/140; 521/134; 521/142; 521/143; 521/79; 521/149

(58) Field of Classification Search .............. 521/134, 521/81, 143, 142, 140, 79, 149
See application file for complete search history.

(56) References Cited

U.S. PATENT DOCUMENTS

| | | | |
|---|---|---|---|
| 3,573,152 A | 3/1971 | Wiley et al. | |
| 4,323,528 A | 4/1982 | Collins | |
| 4,379,859 A | 4/1983 | Hirosawa et al. | |
| 4,464,484 A | 8/1984 | Yoshimura et al. | |
| 4,714,716 A | 12/1987 | Park | |
| 4,824,720 A | 4/1989 | Malone | |
| 4,916,198 A | 4/1990 | Scheve et al. | |
| 5,116,881 A * | 5/1992 | Park et al. | 521/143 |
| 5,527,573 A | 6/1996 | Park et al. | |
| 5,817,705 A | 10/1998 | Wilkes et al. | |
| 6,413,625 B2 * | 7/2002 | Rolle et al. | 428/316.6 |
| 6,417,240 B1 * | 7/2002 | Park | 521/59 |
| 6,417,242 B1 * | 7/2002 | Hughes et al. | 521/142 |
| 6,541,105 B1 | 4/2003 | Park | |
| 6,590,006 B2 | 7/2003 | Park et al. | |
| 6,720,363 B2 * | 4/2004 | Subramonian et al. | 521/81 |
| 2001/0036975 A1 * | 11/2001 | Park et al. | 521/134 |
| 2005/0165165 A1 * | 7/2005 | Zwynenburg et al. | 525/88 |

FOREIGN PATENT DOCUMENTS

| | | | |
|---|---|---|---|
| JP | 2001226510 | * | 8/2001 |
| WO | WO 01/70861 | | 9/2001 |
| WO | WO 02/098963 | | 12/2002 |

* cited by examiner

*Primary Examiner*—Vasu Jagannathan
*Assistant Examiner*—Irina Krylova
(74) *Attorney, Agent, or Firm*—Steven W. Mork

(57) ABSTRACT

Foam a polymer blend of (a) a high melt strength polypropylene (HMS PP); (b) a linear or substantially linear polypropylene that has a melting point within ten degrees Celsius of (a), a melt flow rate that is significantly different than (a) and that is miscible with (a); and, optionally, (c) a polyethylene that is immiscible with (a) produces a polymeric foam having an average cell size of at least four millimeters and that has an inherent open-celled content of at least 40 percent. The HMS PP makes up 60 weight percent (wt %) or more and 90 wt % or less of the total combined weight of (a) and (b). Component (c) makes up 60 wt % or less of the total polymer blend weight.

18 Claims, No Drawings

INHERENTLY OPEN-CELLED POLYPROPYLENE FOAM WITH LARGE CELL SIZE

CROSS REFERENCE STATEMENT

This application claims the benefit of U.S. Provisional Application No. 60/621,495, filed Oct. 22, 2004.

BACKGROUND OF THE INVENTION

1. Field of the Invention

The present invention relates to an inherently open-celled polypropylene-based polymeric foam having a large (at least 1.5 millimeter) average cell size, a process for preparing such a polymeric foam and a process for using such a polymeric foam.

2. Description of Related Art

Foams having a large average cell size (that is, average cell size of at least 1.5 millimeters) are desirable in applications such as filtration and acoustical damping. These same applications benefit from an open-celled foam. Frequently, these applications would further benefit from thermal stability associated with polypropylene (PP) foams so as to allow filtration of hot liquids or acoustical dampening in warm places (for example, engine compartments).

PP foams are desirable for their thermal stability, ability to be easily made by extrusion processes, and recyclability. However, preparing PP foams that have a large average cell size and that are inherently open-celled is challenging. A foam is "inherently open-celled" if it becomes open-celled as the foam expands during formation, as opposed to, for example, during a mechanical perforation step.

U.S. Pat. No. 6,590,006 B2 discloses a polyolefin foam that has a large cell size that is made from a combination of at least 35 percent by weight (wt %) high melt strength (HMS) PP and up to 65 wt % of a free radical polymerized ethylene polymer. However, U.S. Pat. No. 6,590,006 B2 teaches how to prepare a close-celled foam and then perforate the foam to achieve open-cell character.

U.S. Pat. No. 6,541,105 (U.S. Pat. No. '105) discloses open-celled polyolefin foams including an open-celled PP foam that has a cell size of greater than one millimeter, but requires blending polyolefins that have a melting point difference of at least ten degrees Celsius (° C.).

It is desirable to advance the art of PP foams to include PP foams having a cell size larger than that obtainable with the U.S. Pat. No. '105 technology. It desirable to have a PP foam that is inherently open-celled so that perforation is not necessary. It is even more desirable if the polymer blend forming the foam did not need to comprise polymers containing a melting point difference of at least ten ° C. Still more desirable is a polymer composition that can be blown into an inherently open-celled PP foam over a die temperature window of at least ten ° C.

BRIEF SUMMARY OF THE INVENTION

The present invention advances the art of PP foam technology by providing a PP foam and process that meets one or more of the aforementioned desirable characteristics.

In a first aspect, the present invention is an inherently open-celled polymeric foam consisting essentially of a polymer blend having cells with an average cell size of at least four millimeters defined therein wherein the foam has an inherently open-cell content of at least 40 percent (according to American Society for Testing and Materials (ASTM) D2856-94) and wherein the polymer blend consists essentially of: (a) a high melt strength polypropylene; (b) a second polypropylene selected from linear and substantially linear polypropylenes that have a melting point within ten degrees Celsius of (a), a melt flow rate (ASTM D-1238, condition L) that is significantly different than (a), and that are miscible with (a); and, optionally, (c) an ethylene polymer that is immiscible with (a); wherein the polymer blend contains 60 weight percent (wt %) or less of (c) based on polymer blend weight; and wherein (a) makes up at least 60 wt % and 90 wt % or less of the total weight of (a) and (b).

In a second aspect, the present invention is a process for producing the polymeric foam of the first aspect, the process comprising forming a foamable composition by mixing a blowing agent into a softened polymer blend at a mixing pressure and then exposing the foamable composition to a pressure lower than the mixing pressure and allowing the foamable composition to expand into the polymeric foam of the first aspect; wherein the improvement is that the softened polymer blend consists essentially of: (a) a high melt strength polypropylene; (b) a second polypropylene selected from linear and substantially linear polypropylenes that have a melting point within ten degrees Celsius of (a), a melt flow rate (ASTM D-1238, condition L) that is significantly different than (a), and that are miscible with (a); and, optionally, (c) an ethylene polymer that is immiscible with (a); wherein the polymer blend contains 60 weight percent (wt %) or less of (c) based on polymer blend weight; and wherein (a) makes up at least 60 wt % and 90 wt % or less of the total weight of (a) and (b).

In a third aspect, the present invention is a process for using the polymeric foam of the first aspect, comprising the step of placing the polymeric foam of first aspect between two areas such that sound in one area at least partially penetrates the foam in order to reach the second area.

Foams of the present invention are useful, for example, as acoustical dampening materials as well as filter materials.

DETAILED DESCRIPTION OF THE INVENTION

The foam and process of the present invention consisting essentially of a polymer blend consisting essentially of two, preferably three different polymers. Herein, "consisting essentially of" means making up at least 90 weight percent (wt %) or more based on total weight of the composition described. For example, the foam consists essentially of the polymer blend means that the polymer blend makes up at least 90 wt % of the total foam weight. Similarly, the two, preferably three polymers make up at least 90 wt % of the total polymer blend weight.

The first polymer (Component A) is a high melt strength polypropylene (HMS PP). The second polymer (Component B) is a second PP that is different from Component A and that is selected from linear and substantially linear PP having a melting point within ten ° C. of Component A. Without being bound by theory, this particular blend is desirable to form large celled foams with high open-cell content because HMS PP provides stability during foaming due to its strain hardening characteristics during foam expansion while linear or substantially linear PP moderates the strain hardening character of the polymer blend. The concentration of Component A and Component B in the polymer blend of the present invention optimally achieves complementary contribution of properties from both Components A and B—Component A provides integrity to the cell walls during expansion so to prevent foam collapse while Component B provides expandability and a site in the wall that can rupture to form an opening between cells (a pore). As a result, the polymer blend in the present invention can expand sufficiently to create a foam having large cell sizes and an inherently open-celled structure.

Each of Components A and B (Components A and B are collectively "PP Components") is a polymer containing at least 50 weight-percent (wt %) polymerized propylene units, by weight of the polymer. Desirably, one or both PP Component is 80 wt % or more, preferably 90 wt % or more, more preferably 100 wt % (that is, PP homopolymer) polymerized propylene, based on weight of the PP Component. Component A, B or both A and B can also be a random or block copolymer of propylene and an olefin selected from ethylene, 1-olefins (α-olefins) containing four to ten carbon atoms ($C_{4-10}$) and $C_{4-10}$ dienes, or a random terpolymer of propylene and two monomers selected from ethylene and $C_{4-10}$ α-olefins. Desirably, Component A, B, or both A and B is isotactic.

Component A is a high melt strength polypropylene (HMS PP); meaning Component A is a branched polymer prepared by any branching method including irradiation with a high energy electron beam (see, U.S. Pat. No. 4,916,198, incorporated herein by reference), coupling with an azidofunctional silane (see, U.S. Pat. No. 4,714,716, incorporated herein by reference) and by reacting with a peroxide in the presence of a multi-vinyl functional monomer. HMS PP has a branching index of less than one, preferably less than 0.9 and most preferably less than 0.4. The HMS PP preferably has a branching index of at least 0.2. Branching index is a measure of long chain branching in a polymer (see, U.S. Pat. No. 4,916,198 column 3, line 65 to column 4, line 30, incorporated herein by reference, for a method to determine branching index).

Component A desirably has a melt flow rate (MFR) of 0.01 grams per ten minutes (g/10 min.) or more, preferably 0.05 g/10 min. or more, more preferably 0.1 g/10 min. or more, still more preferably 0.5 g/10 min. or more. Desirably, Component A has a MFR of 100 g/10 min. or less, preferably 50 g/10 min. or less, more preferably 20 g/10 min. or less, still more preferably 10 g/10 min. or less. A HMS PP (Component A) with a MFR less than 0.01 g/10 min. tends to be too viscous to foam while one with a MFR of greater than 100 g/10 min. tends to be too fluid to foam. Measure MFR according to American Society for Testing and Materials method (ASTM) D-1238 (condition L: 230 degrees Celsius (° C.) and 2.16 kilogram (kg) weight).

Component B has a significantly different MFR than Component A, which means that Component B has a MFR equal to less than half the MFR of Component A or has a MFR equal to or greater than twice the MFR of Component A. If the MFR of Component B is not significantly different from that of Component A (that is, the MFR is between 0.5-2 times that of the HMS PP component) then the polymer blend tends to expand into a close-celled foam. Measure MFR in the same manner as Component A. For the same reasons as Component A, Component B preferably has a MFR greater than 0.01 g/10 min. and less than 100 g/10 min.

Both PP Components desirably have a melt tension of seven centiNewtons (cN) or more, preferably ten cN or more, more preferably 15 cN or more and most preferably 20 cN or more. Desirably, both PP Components have a melt tension of 60 cN or less, preferably 40 cN or less. A PP Component with a melt tension below seven cN causes a polymer blend to be too unstable to form a foam, while a PP Component having a melt tension above 60 cN causes the polymer blend to be too difficult to expand into a foam. Measure melt tension according to the "Chisso method." The Chisso method refers to the tension in cN of a strand of molten polymer material extruded from a capillary die having a diameter of 2.1 millimeter (mm), a length of 40 mm, and a temperature of 230° C. Extrude the polymer at an extrusion speed of 20 mm/minute and a constant take-up speed of 3.14 meter/minute using a Melt Tension Tester Model 2 (Toyo Seiki Seisaku-sho Ltd.).

While Component A and Component B can have different melt strength values relative to one another, both PP Components desirably have a melt strength of 10 cN or more, preferably 20 cN or more, more preferably 25 cN or more, still more preferably 30 cN or more and 60 cN or less, preferably 55 cN or less. A polymer having a melt strength of less than 10 cN will be too unstable to foam a foam while a polymer with a melt strength of greater than 60 cN will be to difficult to foam. Melt strength refers to the tension in a strand of molten polymer extruded from a 2.1 mm diameter and 4.9 mm long capillary die at 190° C. at a rate of 0.030 milliliters per second and stretched at a constant acceleration using a Goettfert Rheotens melt tension apparatus (Goettfert, Inc.). A polymer's limiting draw force, or strength at break, is the melt strength of the polymer.

While Component A and Component B can have different melt elongation values relative to one another, both PP Components desirably have a melt elongation value of at least 50%, preferably 150% or more, more preferably 200% or more as measured by the Rheotens melt tension apparatus. If a PP Component has a melt elongation value of less than 50% it will not expand into a foam. There is no known upper limit on suitable melt elongation values of the PP Components.

Component A desirably has a tan δ value of 1.5 or less, preferably 1.2 or less, and more preferably 1.0 or less. Component A will generally have a tan δ value of 0.5 or more. A polymer having a tan δ value that is higher than 1.5 is extremely viscous and tends to facilitate foam collapse during processing. A tan δ value is the ratio g"/g', where g" is the loss modulus and g' is the storage modules of the polymer melt. Measure a tan δ value for a polymer using a 2.5 mm thick and 25 mm diameter sample of the polymer at 190° C. and using a mechanical spectrometer (for example, Rheometrics Model RMS-800; Rheometric, Inc.) oscillating at a frequency of one Radian per second.

Examples of suitable HMS PP polymers include Pro-fax™ PF814 (Basell Polyolefins Company N.V., The Netherlands, trademark of Montell North America Inc.) and Daploy WD130HMS (from Borealis A/S, Denmark).

Select Component B from linear and substantially linear PP polymers that have a melting point within ten ° C. of Component A. A "linear PP" is free of any long chain branching and has a branching index of one (1). A "substantially linear PP" contains up to three, preferably up to one long chain branch per 1,000 carbons. Typically, substantially linear PP contains 0.01 or more, more typically 0.03 or more long chain branches per 1,000 carbons. A substantially linear PP has a branching index of less than one. In the polymer blends of the present invention, Component B has a branching index greater than the Component A in the same polymer blend.

Component B is desirably "miscible", preferably "completely miscible" with Component A. Characterize polymer miscibility using differential scanning calorimetry (DSC). Heat a solid sample blend of the Components A and B from 23° C. until the sample has completely melted. Plot the heat flux necessary to maintain a constant sample temperature increase of ten ° C. per minute against the sample temperature. The polymers are "miscible" if they are either "completely miscible" or "substantially miscible." If the Component polymers in the polymer sample are "completely miscible" there will be one peak in the plot. The polymers are "substantially miscible" if at least 50% of the area of their corresponding peaks overlaps. The polymers are "immiscible" if they are either "substantially immiscible" or "completely immiscible." The polymers are "completely immiscible" if there is a peak corresponding to each polymer and the peaks do not overlap (they are baseline resolved). The polymers are "substantially immiscible" if less than 50% of the area of their corresponding peaks overlap.

Examples of suitable Component B polymers include Profax 6823 (Basell Polyolefins Company N.V., The Netherlands) and PP 5D45 (The Dow Chemical Company, USA).

Component A and Component B have a melting point within 10° C. and, as a result, efficiently blend during foam processing.

A combination of Component A and Component B in the polymer blend contains 60 wt % or more and 90 wt % or less Component A, based on combined weight of the Components A and B. The combination can contain 70 wt % or more, even 80 wt % or more of Component A. Wt % is relative to total weight of a combination of Components A and B. Polymer blends containing less than 60 wt % HMS PP tend to be unstable and collapse upon foaming. Polymer blends containing more than 90 wt % of Component A tend to be close-celled (20 percent or less open-cell content).

The third polymer component (Component C), an ethylene polymer component, is desirable but not necessary in the polymer blend. Component C enhances acoustical dampening properties of a foam made from the polymer blend. Without being bound by theory, the presence of Component C in the foam walls may enable the walls to vibrate more readily and, thereby, dampen acoustical energy more readily than walls made from only the PP Components. Component C is "immiscible," preferably "completely immiscible" with Component A. Characterize miscibility using the DSC method described for the PP Components.

Polymers suitable as Component C comprise greater than fifty (50) wt %, preferably greater than eighty (80) wt % polymerized ethylene units by weight of the polymer. Examples of suitable polymers for Component C include low density polyethylene (LDPE), linear low density polyethylene (LLDPE), high density polyethylene (HDPE), ethylene-vinyl acetate copolymers (EVA), ethylene-ethylacrylate copolymers (EEA), and ethylene-acrylic acid copolymers (EAA). Component C can contain one or more suitable polymer. Preferably, select Component C from a group consisting of LDPE, LLDPE and HDPE. Most preferably, Component C is LDPE.

Branched ethylene polymers are particularly desirable as Component C in order to provide both an acoustical dampening effect in the foam and to provide optimal foaming stability during foaming. Branched polymers experience strain hardening during polymer expansion while foaming, which enhances the stability of the foam during its formation.

Desirably, Component C has a melt index, I2, of 0.1 g/10 min. or more, preferably 0.25 g/10 min. or more, more preferably 0.5 g/10 min. or more and 100 g/10 min. or less, preferably 50 g/10 min. or less, more preferably 5 g/10 min. or less. Measure I2 according to ASTM D-1238 at 190° C. and with a 2.16 kg load. Ethylene polymers having an I2 of less than 0.1 g/10 min. are too viscous to foam readily while ethylene polymer having an I2 of greater than 100 g/10 min. do not have sufficient viscosity to form a stable foam.

Component C can be present in the polymer blend at an amount equal to 60 wt % or less, preferably 50 wt % or less and more preferably 40 wt % or less based on the total weight of the polymer blend. Polymer blends containing more than 60 wt % Component C tend to form unstable foams that collapse during processing. The polymer blend can be free of Component C; therefore, Component C is an optional component.

Examples of suitable polymers for Component C include LDPE 620i and LDPE 300R (both available from The Dow Chemical Company).

In a first aspect, the present invention is a polymeric foam consisting essentially of the polymer blend of Components A, B and, optionally, C. The relative ratios of Components A, B and C are as described for the polymer blend, above. The foam has an average cell size of 4 mm or larger, preferably 7 mm or larger. The foam can have an average cell size of 10 mm or larger. There is no known upper limit to the cell size of the present invention although the foams generally have an average cell size of less than 20 mm. Measure average cell size according to ASTM D 3756.

Foams of the present invention are inherently open-celled, meaning pores that interconnect cells form during the foam formation process. As such, no additional processing (for example, perforation) is necessary to open the cell structure of the present foams after foaming. Inherently open-celled foams of the present invention are distinct from perforated foams. Perforated foams have a linear alignment of openings through two or more cells (at least 3 cell walls) including at least one foam surface. The openings are essentially the same size. Generally, perforated foams have a linear alignment of openings forming a pathway extending through two opposing primary foam surfaces (surfaces of greatest area) without skiving the foam surfaces.

In contrast, an inherently open-celled-foam of is typically free from a linear alignment of openings that extends through two or more cells, particularly such an alignment of openings that are essentially the same size. Furthermore, inherently open-celled foams are typically free of a pathway of linear aligned openings of essentially the same size that form a pathway extending through two opposing primary foam surfaces without skiving the foam surfaces.

Foams of the present invention have an inherently open-celled structure corresponding to 40 percent or more, preferably 60 percent or more, more preferably 80 percent or more, still more preferably 90 percent or more open-cell content. Foams of the present invention can have an inherently open-celled structure of up to and including 100% open-cell content. Measure open-cell content according to ASTM D2856-94, Procedure A. Additional processing methods such as perforation are suitable to modify or enhance the open-cell character of foams of the present invention. Methods such as perforation may be particularly desirable to enhance the open-cell character through a skin on the surface of a foam.

Desirably, foams of the present invention are recyclable. A foam is "recyclable" if it can be reprocessed into a new polymeric foam without causing any visually detectable impact on the new polymeric foam's properties as compared to a new polymeric foam prepared without reprocessed polymer under the same processing conditions. Ideally, foams of the present invention are sufficiently recyclable to allow a loading of at least 20 wt %, based on polymer blend weight, into a new polymeric foam without affecting foam properties.

Foams of the present invention are useful for absorbing sound in a range of 20 to 20,000 Hertz (Hz), preferably 500 to 10,000 Hz, more preferably 2,000 to 5,000 Hz.

Desirably, a foam of the present invention has a noise reduction coefficient (NRC) of 0.2 or more, preferably 0.35 or more, more preferably 0.4 or more either with, or without the foam's skin. The foam's skin is a polymer film on the surface of a foam that is removable by skiving. NRC is an arithmetic average of the sound absorption coefficients at 250, 500, 1000, and 2000 Hertz. Measure sound absorption coefficients according to ASTM E-1050 using samples 29 mm and 100 mm in diameter and 25 mm thick. Suitable apparatus for measure the coefficients include a Model 4206 acoustical impedance tube and Model 3555 signal analyzer, both available from Bruel and Kjaer A/S, Maerum, Denmark.

Many foams of the present invention also have a heat distortion temperature of 130° C. or more, preferably 140° C. or more, more preferably 150° C. or more. Heat distortion temperature refers to the temperature above which a foam will shrink by at least five percent of its volume upon exposure to that temperature for more than one hour. Having a high heat distortion temperature is desirable in applications requiring a relatively high service temperature (for example, the engine compartment of an automobile). High service temperature applications benefit from foam having PP homopolymer as Component A and Component B in order to obtain optimal thermal stability.

In a second aspect, the present invention is a process for manufacturing the polymeric foam of the first aspect by forming a foamable composition from a blowing agent and a flowable polymer composition and then expanding the foamable composition into a foam. Prepare the flowable polymer composition (that is, a softened polymer blend) by softening the polymer blend consisting essentially of Components A, B, and preferably (though not necessarily) Component C. The relative ratios of Components A, B and C are as described for the polymer blend, above. Prepare the foamable composition by mixing into the flowable polymer composition a blowing agent at a mixing pressure. Expose the foamable composition to a pressure lower than the mixing pressure to expand the foamable composition into a foam. A skilled artisan recognizes that this is a general process for preparing a polymeric foam and that any of numerous known processes are suitable.

Extrusion processes are most desirable. In an extrusion process, feed the polymer components (Components A, B and when present, C) into an extruder at a temperature sufficient to soften each polymer. Mix the polymer components to form a flowable polymer composition. Add blowing agent to the blended composition at a mixing pressure to form a foamable composition. Extrude the foamable composition through a die at a die temperature and pressure to a zone of lower pressure than the die pressure. Preferably, keep the die at a die temperature within 30° C. of the lowest temperature necessary to soften all of the polymer components comprising the polymer blend to form a flowable composition. The lowest temperature necessary to soften all of the polymer components into a flowable composition is the crystalline melting point ($T_m$) for the highest melting polymer component in the foamable composition or glass transition temperature ($T_g$) for the polymer component in the foamable composition having the highest glass transition temperature, whichever is higher. Desirably, maintain the die temperature below 165° C. or blowing agent tends to permeate quickly through the softened polymer blend without contributing to the polymer's expansion.

One of the advantages of the present invention is that the polymer blend allows for a broad die temperature window, which is a range of die temperatures in which the making of an inherently open-celled foam (greater than 20% open-cell content) having an average cell size of four mm or more is possible during an extrusion process. In general, the die temperature window is eight ° C. or more, and can be ten ° C. or more, even 15° C. or more.

Mix blowing agent into a flowable polymer composition by any means known in the art such as with an extruder, mixer, or blender. Any conventional blowing agent is suitable to form foams of the present invention. U.S. Pat. No. 5,527,573, for example, describes blowing agents that are suitable for the process of the present invention in column 4, line 66 through column 5, line 20 (incorporated herein by reference). Particularly desirable blowing agents include aliphatic hydrocarbons having a boiling temperature between −50° C. and +50° C. such as n-pentane, iso-pentane, n-butane, iso-butane, propane, and combinations thereof including iso-butane/n-butane blends. Water and carbon dioxide are also desirable blowing agents. Halogenated blowing agents such as fluorinated hydrocarbons are also suitable blowing agents. A foamable composition can contain any one or a mixture of blowing agents.

Suitable extrusion processes include an accumulating extrusion process in accordance with the teachings in U.S. Pat. No. 4,323,528 and U.S. Pat. No. 5,817,705 (both of which are incorporated herein by reference). Accumulating extrusion utilizes an extruder-accumulator system that includes a holding zone (or accumulator) where foamable gel remains under conditions that preclude foaming. The accumulator has an outlet die that opens into a zone of reduced pressure. The die has an orifice that intermittently opens and then closes again. A mechanical ram exerts pressure on the foamable composition concurrent with the opening of the orifice. As the ram exerts pressure, a portion of the composition extrudes through the die and into a zone of reduced pressure where the composition expands into polymeric foam. The accumulating extrusion process is an intermittent, rather than continuous, manner of extruding polymeric foam. Nonetheless, foam product from an accumulator extruder can closely resemble that of a continuous extrusion process.

Coalesced foam processes are also suitable embodiments of the present extrusion process. U.S. Pat. No. 3,573,152 and U.S. Pat. No. 4,824,720 (the teachings of both are incorporated herein by reference) contain descriptions of coalesced foam processes. In general, during a coalesced foam process a foamable polymer composition extrudes through a die containing multiple orifices oriented such that when the foamable polymer composition expands upon extrusion the resulting strands of foaming polymer contact one another and partially coalesce together. The resulting foam is a composition of foam strands extending in the extrusion direction of the foam. A skin typically defines each strand in the coalesced foam.

Bead foam processes are also suitable embodiments of the present invention. Extrusion and batch bead foam processes are suitable. The extrusion process requires extruding a foam strand and granulating the stand to form beads. The batch process requires forming discrete resin particles, such as granulated resin pellets, as a suspension in a liquid medium in which the pellets are substantially insoluble (for example, a water medium); impregnating the pellets with a blowing agents under an elevated pressure and temperature; and then rapidly discharging the pellets into a zone of lower pressure than the elevated pressure and allowing the pellets to expand into foam beads. U.S. Pat. No. 4,379,859 and U.S. Pat. No. 4,464,484 (both incorporated herein by reference) disclose suitable batch bead foam process.

Foams of the present invention are particularly useful as acoustical insulating materials. The process of using the foams as acoustical insulating materials comprises the step of placing the foam of the first aspect of the present invention between two areas such that sound in one area at least partially penetrates the foam in order to reach the second area. The areas can be, for example, rooms of a building, compartments in an enclosure (for example, engine compartment and passenger compartments of a vehicle), or two portions of a room in a building. Desirably, place the foam between a source of a sound in one area and a second area when desiring acoustical dampening of the sound prior to reaching the second area.

Foams of the present invention are also well suited for use as filters in filtration applications.

Foams of the present invention may contain one or more conventional additives dispersed within the polymer blend. The additives include inorganic fillers, conductive fillers, pigments, antioxidants, acid scavengers, flame retardants, ultraviolet absorbers, processing aids, extrusion aids, permeability modifiers, anti-static agents, radiation blocking materials and other thermoplastic polymers. The foam materials of this invention preferably contain at least one radiation blocking material such as carbon black and a flame retardant additive. The total amount of conventional additive in the foam of the present invention is ten weight percent or less based on the total foam weight.

The following examples serve to further illustrate specific embodiments the present invention.

Materials

Pro-fax PF814 resin is a HMS PP having a MFR of 3 g/10 min., from Basell Polyolefins Company N.V., The Netherlands.

PP1 is a PP homopolymer resin having a fractional melt flow of 0.5. (PP1 can be, for example, Pro-fax PF6823 available from Basell Polyolefins Company N.V., The Netherlands).

LDPE 1 is a LDPE resin having a density of 0.923 grams per cubic centimeter ($g/cm^3$) and an I2 of 1.0 g/10 min. (for example, LDP 300R from The Dow Chemical Company, Midland, Mich., USA).

PLASBLAK™ PE3037 is a concentrate composition containing 25 wt % carbon black (by concentrate weight) in LDPE. PLASBLAK is a trademark of Cabot Corporation.

EPR 1 is an ethylene/propylene copolymer having a MFR of 0.8 g/10 min and where 10 wt % of the monomer units are ethylene. In particular, EPR 1 is a copolymer with 80 wt %, based on EPR 1 weight of PP and 20 wt %, based on EPR 1 weight of a propylene/ethylene (PE) block copolymer containing 50 wt % propylene units and 50 wt % ethylene units, base on PE copolymer weight. EPR 1 has a MFR of 0.8 g/10 min. (230° C., 2.16 kg load) and a density of 0.9 $g/cm^3$.

IRGANOX™ 1010 is a phenolic antioxidant/stabilizer. IRGANOX is a trademark of CIBA Specialty Chemicals Corporation.

IRGAFOS™ 126 is a phosphate antioxidant/stabilizer. IRGAFOS is a trademark of CIBA Specialty Chemicals Corporation.

GMS is glycerol monostearate, a foam stabilizer.

Determine average cell size for the samples in each Example according to ASTM D 3756. Determine open-cell content according to ASTM D2856-94. Determine density of the samples according to ASTM D3575, Suffix W, Method A.

Example 1

Example 1 illustrates polymeric foams of the present invention. The polymer blend composition in Example 1 allows fabrication of polymeric foams of the present invention by extrusion over a die temperature window of at least 17° C. Properties of the foam are in Table 1.

Prepare Samples 1.1-1.4 using a single screw 2-inch (50.8 mm) extruder with (in order) a feeding zone for resins and solid additive, a melting zone, a metering zone, a mixing zone and a cooling zone. Between the metering and mixing zone is an opening for blowing agent injection. Attach a rectangular gap-adjustable die orifice having a width of 50 mm to the extruder after the cooling zone.

Table 1 identifies the polymer components and concentrations for each of Sample 1.1-1.4, as well as resulting foam properties for those Samples. Form a pelletized polymer mixture by mixing pellets of Components A, B and C (see Table 1). Add sufficient PLASBLAK PE3037 to achieve a concentration of carbon black of 0.4 weight parts per 100 parts of the pelletized polymer mixture weight. Add 0.66 parts by weight IRGANOX 1010 and 0.1 parts by weight IRGAFOS 126 to the pelletized polymer mixture, each based on 100 parts by weight pelletized polymer mixture weight. Add the IRGANOX AND IRGAFOS components as 25 wt % concentrates in LDPE (0.92 $g/cm^3$ and I2 of 22 g/10 min.). Also add 0.8 parts by weight GMS, based on pelletized polymer mixture weight.

Feed the pelletized polymer mixture and additives into the extruder at a rate of 50 kg per hour. Maintain the temperature of the extruder zones at: 160° C. for the feeding zone, 190° C. for the melting zone, 220° C. for the metering zone and 220° C. for the mixing zone. Keep the cooling zone and die temperature at the same temperature (see, Table 1 for that temperature for each Sample). Inject isobutane into the extruder at the mixing zone at a uniform rate of 8 wt % based on the total weight of pelletized polymer mixture and the additives to form a foamable polymer composition inside the extruder.

Extrude foamable polymer composition through the die orifice using a die pressure of 3500 kiloPascals (kPa) into atmospheric pressure (101 kPa) and 23° C. and allow the composition to expand into a polymeric foam. The die slit opening is 0.35 mm. Resulting foam samples have a thickness of 3-4 centimeters and a width of 13-14 centimeters.

TABLE 1

| Sample | Die Block Temp. (° C.) | Polymer Blend Components (wt % of Polymer Blend) | | | Foam Density (kg/m3) | Average Cell Size (mm) | Open-Cell Content (%) | NRC w/skin (ASTM E-1050) |
| --- | --- | --- | --- | --- | --- | --- | --- | --- |
| | | A | B | C | | | | |
| 1.1 | 161 | Pro-fax PF814 (40) | PP 1 (20) | LDPE 1 (40) | 27.2 | 12.2 | 91.8 | (not measured) |
| 1.2 | 155 | Pro-fax PF814 (40) | PP 1 (20) | LDPE 1 (40) | 26.5 | 11.8 | 84.5 | (not measured) |
| 1.3 | 152 | Pro-fax PF814 (40) | PP 1 (20) | LDPE 1 (40) | 27.8 | 11.2 | 72.2 | (not measured) |

TABLE 1-continued

| Sample | Die Block Temp. (° C.) | Polymer Blend Components (wt % of Polymer Blend) | | | Foam Density (kg/m3) | Average Cell Size (mm) | Open-Cell Content (%) | NRC w/skin (ASTM E-1050) |
|---|---|---|---|---|---|---|---|---|
| | | A | B | C | | | | |
| 1.4 | 144 | Pro-fax PF814 (40) | PP 1 (20) | LDPE 1 (40) | 30.2 | 10.6 | 43.7 | 0.42 |
| 2.1 | 161 | Pro-fax PF814 (50) | PP 1 (10) | LDPE 1 (40) | 28.9 | 4.1 | 89.5 | 0.36 |
| 2.2 | 155 | Pro-fax PF814 (50) | PP 1 (10) | LDPE 1 (40) | 28.3 | 10.5 | 41.1 | 0.41 |
| 3.1 | 144 | Pro-fax PF814 (40) | EPR 1 (20) | LDPE 1 (40) | 30.6 | 4.1 | 74.6 | (not measured) |

Example 2

Example 2 illustrates two foam samples (2.1 and 2.2) of the present invention prepared using 50 wt % Pro-fax PF814 as Component A, 10 wt % of PP 1 as Component B, and 40 wt % of LDPE 1 as Component C, with wt % based on polymer blend weight. This example also illustrates that this particular polymer blend ratio has a die temperature window of at least 6° C.

Prepare Samples 2.1 and 2.2 in the same manner as Samples 1.1-1.4 except use the polymer composition and die temperature shown in Table 1 and a die pressure of 1900 kPa. Properties of Samples 2.1 and 2.2 are also in Table 1.

Example 3

Example 3 illustrates a foam sample (3.1) of the present invention comprising an ethylene/propylene copolymer as Component B instead of a PP homopolymer.

Prepare Sample 3.1 in the same manner as Samples 1.1-1.4 except use a die pressure of 2100 kPa and a die temperature as shown in Table 1. Properties of Sample 3.1 are also in Table 1.

The invention claimed is:

1. An inherently open-celled polymeric foam consisting essentially of a polymer blend having cells with an average cell size of at least four millimeters defined therein wherein the foam has an inherently open-cell content of at least 40 percent (according to American Society for Testing and Materials (ASTM) D2856-94) and wherein the polymer blend consists essentially of:
(a) a high melt strength polypropylene;
(b) a second polypropylene selected from linear polypropylenes and polypropylenes having up to three long chain branches per 1,000 carbons, said second polypropylene having a melting point within ten degrees Celsius of (a), a melt flow rate (ASTM D-1238, condition L) that is equal to or less than one half that of (a) or equal to or greater than twice that of (a), and that are miscible with (a); and,
(c) an ethylene polymer that is immiscible with (a) and that comprises greater than 50 weight-percent polymerized ethylene units by weight of the polymer and that is selected from a group consisting of low density polyethylene, linear low density polyethylene, high density polyethylene, ethylene-vinyl acetate copolymers, ethylene-ethylacrylate copolymers, and ethylene-acrylic acid copolymers;
wherein the polymer blend contains 60 weight percent (wt %) or less of (c) based on polymer blend weight; and wherein (a) makes up at least 60 wt % and 90 wt % or less of the total weight of (a) and (b).

2. The foam of claim 1, wherein (a) is a polypropylene homopolymer.

3. The foam of claim 1, wherein (b) is a polypropylene homopolymer.

4. The foam of claim 3, wherein (a) is a polypropylene homopolymer.

5. The foam of claim 1, wherein (a) is a polypropylene homopolymer.

6. The foam of claim 1, wherein (b) is a polypropylene homopolymer.

7. The foam of claim 6, wherein (a) is a polypropylene homopolymer.

8. The foam of claim 1, wherein (c) is low density polyethylene.

9. A process for using the polymeric foam of claim 1, comprising the step of placing the foam of claim 1 between two areas such that sound in one area at least partially penetrates the foam in order to reach the second area.

10. A process for producing the polymeric foam of claim 1, the process comprising forming a foamable composition by mixing a blowing agent into a softened polymer blend at a mixing pressure and then exposing the foamable composition to a pressure lower than the mixing pressure and allowing the foamable composition to expand into the polymeric foam of claim 1; wherein the improvement is that the softened polymer blend consists essentially of:
(a) a high melt strength polypropylene;
(b) a second polypropylene selected from linear polypropylenes and polypropylenes having up to three long chain branches per 1,000 carbons, said second polypropylene having a melting point within ten degrees Celsius of (a), a melt flow rate (ASTM D-1238, condition L) that is equal to or less than one half that of (a) or equal to or greater than twice that of (a)
and that are miscible with (a); and,
(c) an ethylene polymer that is immiscible with (a) and that comprises greater than 50 weight-percent polymerized ethylene units by weight of the polymer and that is selected from a group consisting of low density polyethylene, linear low density polyethylene, high density polyethylene, ethylene-vinyl acetate copolymers, ethylene-ethylacrylate copolymers, and ethylene-acrylic acid copolymers;

wherein the polymer blend contains 60 weight percent (wt %) or less of (c) based on polymer blend weight; and wherein (a) makes up at least 60 wt % and 90 wt % or less of the total weight of (a) and (b).

11. The process of claim 10, wherein the process comprises forming the foamable polymer composition from the softened polymer blend and the blowing agent within an extruder and then extruding the foamable polymer composition from the extruder, through a die, into an atmosphere of lower pressure than in the extruder.

12. The process of claim 10, wherein (a) is a polypropylene homopolymer.

13. The process of claim 10, wherein (b) is a polypropylene homopolymer.

14. The process of claim 13, wherein (a) is a polypropylene homopolymer.

15. The process of claim 10, wherein (a) is a polypropylene homopolymer.

16. The process of claim 10, wherein (b) is a polypropylene homopolymer.

17. The process of claim 16, wherein (a) is a polypropylene homopolymer.

18. The process of claim 10, wherein (c) is low density polyethylene.

* * * * *